(12) United States Patent
Zhisong et al.

(10) Patent No.: US 9,490,683 B2
(45) Date of Patent: Nov. 8, 2016

(54) THERMOSENSITIVE ELEMENT AND A VEHICLE STARTER MOTOR

(71) Applicant: Bosch Automotive Products (Changsha) Co. Ltd., Xingsha, Changsha Hunan (CN)

(72) Inventors: Wang Zhisong, Changsha Hunan (CN); Wang Xian, Changsha Hunan (CN)

(73) Assignee: BOSCH AUTOMOTIVE PRODUCTS (CHANGSHA) CO. LTD., Changsha Hunan (CN)

( * ) Notice: Subject to any disclaimer, the term of this patent is extended or adjusted under 35 U.S.C. 154(b) by 421 days.

(21) Appl. No.: 14/088,958

(22) Filed: Nov. 25, 2013

(65) Prior Publication Data
US 2014/0117816 A1 May 1, 2014

(30) Foreign Application Priority Data

Oct. 28, 2012 (CN) .......................... 2012 1 0493572

(51) Int. Cl.
*H02K 11/00* (2016.01)
*H02K 11/25* (2016.01)
*H01H 11/00* (2006.01)

(52) U.S. Cl.
CPC ........... *H02K 11/0047* (2013.01); *H02K 11/25* (2016.01)

(58) Field of Classification Search
CPC ......... H02K 11/0047; H02K 11/0052; H02K 11/0057; H02K 11/25

USPC ................... 310/68 C, 71, 323.21, 315, 305; 337/112, 13, 16; 29/622
See application file for complete search history.

(56) References Cited

U.S. PATENT DOCUMENTS

| | | | | |
|---|---|---|---|---|
| 3,753,070 A * | 8/1973 | Bunger | ................... | H02H 3/085 318/472 |
| 4,389,692 A * | 6/1983 | Sander | .................... | F02N 11/08 123/179.15 |
| 4,567,390 A * | 1/1986 | Stewart | ................... | H02K 11/25 310/68 C |
| 4,906,962 A * | 3/1990 | Duimstra | ............... | H01H 61/04 337/148 |
| 5,055,726 A * | 10/1991 | D'Entremont | ....... | H01H 61/002 310/68 C |
| 5,723,922 A * | 3/1998 | Fowlkes | ................. | H02K 11/25 310/68 C |
| 5,907,204 A * | 5/1999 | Matsushima | .......... | H01H 37/52 310/68 C |

* cited by examiner

*Primary Examiner* — Terrance Kenerly
*Assistant Examiner* — Ahmed Elnakib
(74) *Attorney, Agent, or Firm* — Norton Rose Fulbright US LLP

(57) ABSTRACT

A motor, and a starter for a vehicle including a motor are described. The motor includes an excitation coil and a thermal element. The excitation coil is electrically connected with the bus terminal through which current flows when the motor is in operation. The bus terminal has a thermal contact surface. The thermosensitive element is fixed onto the bus terminal and has a collection surface in thermal contact with the thermal contact surface. The motor is provided with a thermal protection function.

16 Claims, 5 Drawing Sheets

THERMOSENSITIVE ELEMENT AND A VEHICLE STARTER MOTOR

CROSS REFERENCE TO RELATED APPLICATION

The present application claims priority to Application No. CN 201210493572.9, filed in the People's Republic of China on Nov. 28, 2012, which is expressly incorporated herein in its entirety by reference thereto.

FIELD OF INVENTION

The present invention relates to the technical field of motor and starter for a vehicle, and in particular to a motor having thermal protection function.

BACKGROUND INFORMATION

A motor generally generates heat during operation, and in some particular cases, excessive heat may be generated to cause high temperature, which would cause operational malfunction or even burning up of the motor. For example, in a starter for starting an engine, if the engine can not be started due to various reasons, then the user may try to start the engine repeatedly many times or continuously for a long time duration through the starter. However, since the current through the motor is very large in the starter (up to 1500-2000 amperes), if the starter operates repeatedly or continuously within a short time, a large amount of heat will be generated in the starter and cause a sharp rise in the temperature of the motor. If no measures are taken, it is very likely that the motor will be burned up. In order to avoid damage to the motor due to high temperatures, some circuits of the motor are provided with a fuse, which will melt to cut off the circuit when the temperature is excessively high. However, in such a case, since the fuse cannot be restored by itself, the motor cannot be operated any longer. A new fuse is required to replace the old one so as to restore the circuit of the motor, thus not only causing inconvenience, but also incurring cost involved in the consumption of the fuse.

Therefore, there is a need for providing improved technical solutions to overcome the technical problems existing in the prior art.

SUMMARY

A technical problem to be addressed by the present invention is to provide automatic thermal protection for a motor.

In order to address the above technical problem, the present invention provides an exemplary motor comprising:
- an excitation coil electrically connected with a bus terminal through which current flows when the motor is in operation, and the bus terminal having a thermal contact surface;
- a thermosensitive element fixed onto the bus terminal and having a collection surface in thermal contact with the thermal contact surface.

Optionally, the motor may further comprise a bracket fixed to the bus terminal and holding the thermosensitive element at least partially between the bracket and the bus terminal, wherein the bracket, which is pre-deformed elastically, applies elastic pre-pressure to the thermosensitive element in a direction towards the bus terminal.

Optionally, the bracket may comprise a side wall and an end wall formed integrally of metal, wherein the end wall is located at an end of the side wall, and a first opening is formed at another end of the side wall; the thermosensitive element is mounted to the bracket from the first opening and at least partially pressed against an inner side of the end wall, and an edge of the first opening of the side wall is welded to the bus terminal.

Optionally, a second opening may be provided at a middle portion of the end wall to communicate the inner side and the outer side thereof, wherein the thermosensitive element extends to the outside of the end wall partially through the second opening.

Optionally, the end wall may be elastically pre-deformed so that its inner side applies the elastic pre-pressure to the thermosensitive element.

Optionally, a section reducing structure may be provided at a location on the bus terminal that is adjacent to the thermal contact surface for reducing a local area of a conductive section of the bus terminal, wherein the bracket is welded around the section reducing structure of the bus terminal by the way of laser welding and the collection surface contacts the thermal contact surface around the section reducing structure.

Optionally, the bracket may comprise an elastic tab which is spaced apart from the collection surface, wherein the bus terminal is detachably mounted to the bracket and is inserted between the elastic tab and the collection surface, and the elastic tab provides elastic pre-pressure to the bus terminal.

Optionally, the bracket may comprise a main body portion and two side arms, wherein the two side arms extend out laterally from two opposite sides of the main body portion respectively, two opposite ends of the elastic tab are connected to the two side arms respectively and a longitudinally extending passage is formed between a middle portion of the elastic tab and the collection surface, and the bus terminal is inserted into the passage.

Optionally, the elastic tab may be formed by stamping a metal sheet, and a protrusion which protrudes towards the passage is formed by stamping the middle portion of the elastic tab.

Optionally, a stop tab may extend out of the main body portion, wherein the stop tab prevents a longitudinal displacement of the bus terminal inserted into the passage.

Optionally, the thermosensitive element may comprise a thermal bimetallic piece, wherein the collection surface is located on the thermal bimetallic piece or in thermal contact with the thermal bimetallic piece.

Optionally, the section reducing structure may be a through hole which extends through the bus terminal or a recess which is recessed into the bus terminal.

In order to address the above technical problem, another exemplary aspect of the present invention provides a starter for vehicle comprising a motor described above.

In the motor and starter according to the present invention, the bus terminal electrically connected with the excitation coil has a thermal contact surface. Since the collection surface of the thermosensitive element is in thermal contact with the thermal contact surface of the bus terminal, the thermosensitive element is able to sense the temperature of the bus terminal. When the motor reaches an excessively high temperature due to a strong current passing through the circuit of the motor or a continuous operation of the motor or starter for too long, the thermosensitive element can sense the temperature from the bus terminal and therefore causes the circuit of the motor to be cut off, and the operation of motor ceases so as to prevent the motor from overheating, thus effectively providing a thermal protection function for the motor. When the motor which has ceased operation cools down gradually and naturally to return to a normal temperature range, the thermosensitive element can still sense the temperature from the bus terminal such that a switch on of the circuit of the motor is restored, thus enabling the motor to return to normal operation automatically.

From the following detailed description made with reference to accompanying drawings, other exemplary aspects and features of the present invention will become apparent. However, it is understood that these accompanying drawings are designed for illustration purpose only, and are not intended to limit the scope of the present invention. It is also noted that unless otherwise indicated, the accompanying drawings are intended only to schematically depict the structures and flowchart described herein, and are not necessarily drawn to scale.

The present invention will become more fully understood with reference to the following detailed description of the exemplary embodiments made in connection with the accompanying drawings, wherein identical reference numbers identify identical elements throughout the drawings.

DETAILED DESCRIPTION

In order to help those skilled in the art to understand the subject matter of the present invention, exemplary embodiments of the present invention will be described in detail hereinafter with reference to the accompanying drawings.

Figure 1:
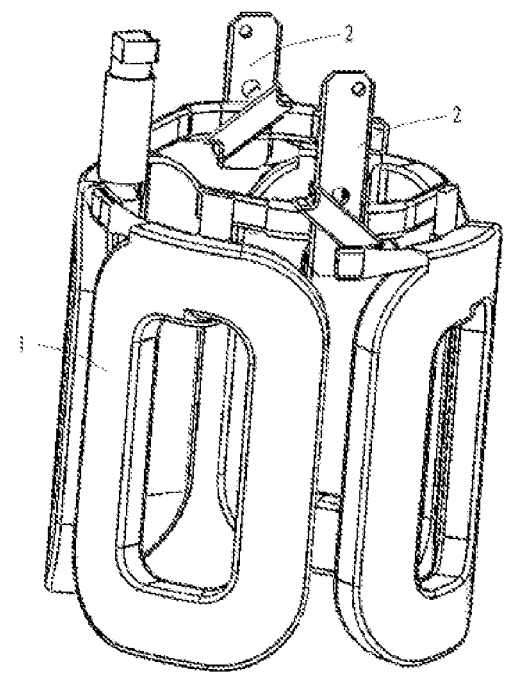
FIG. 1 shows a schematic partial view of a motor according to an exemplary embodiment of the present invention, wherein an excitation coil is shown connected with a bus terminal, but a thermosensitive element is not yet mounted therein.
Figure 2:
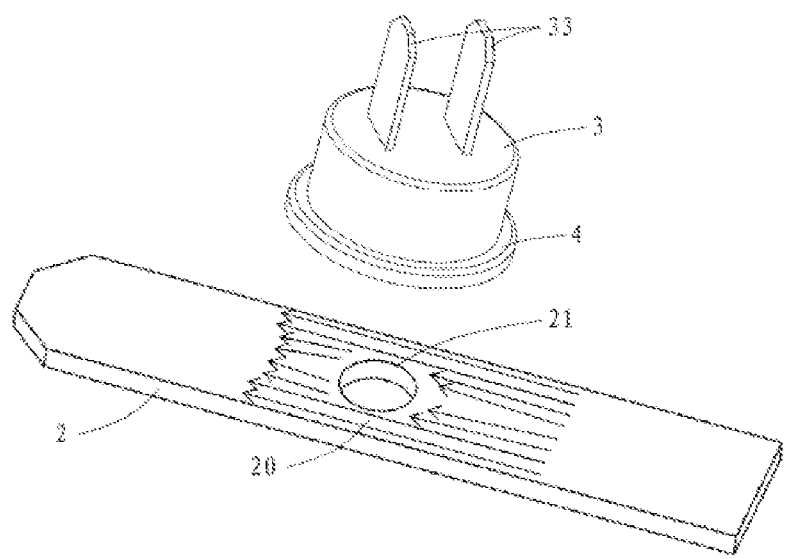
FIG. 2 is a schematic view showing a state in which the thermosensitive element and the bus terminal are disassembled according to a first exemplary embodiment of the present invention, wherein a bracket is mounted on the thermosensitive element.
Figure 3:
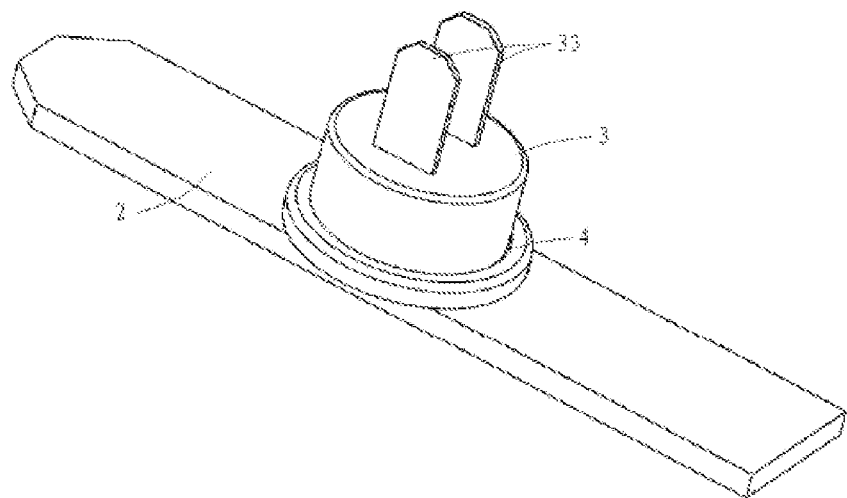
FIG. 3 is a schematic view showing the thermosensitive element shown in FIG. 2 which is assembled onto the bus terminal.
Figure 4:
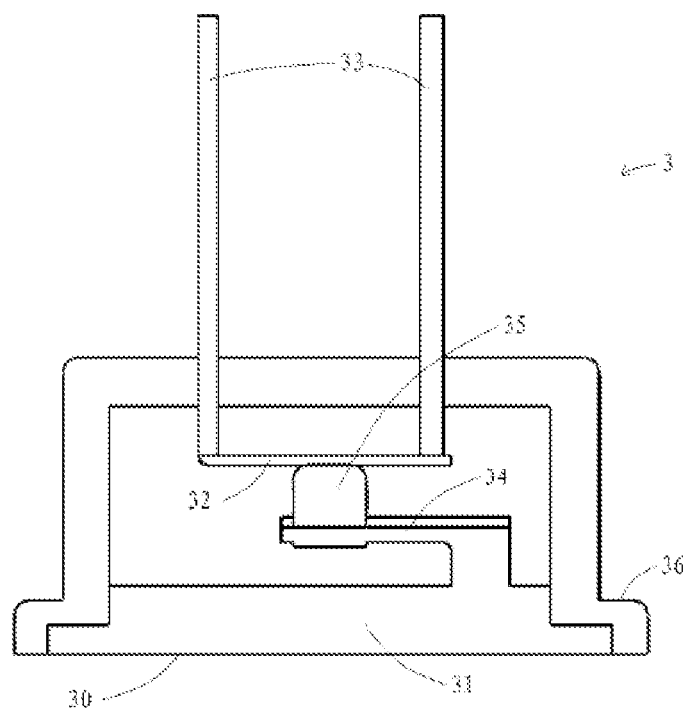
FIG. 4 is a schematic sectional view showing the thermosensitive element shown in FIG. 2, wherein the thermosensitive element is not mounted with the bracket.
Figure 5:
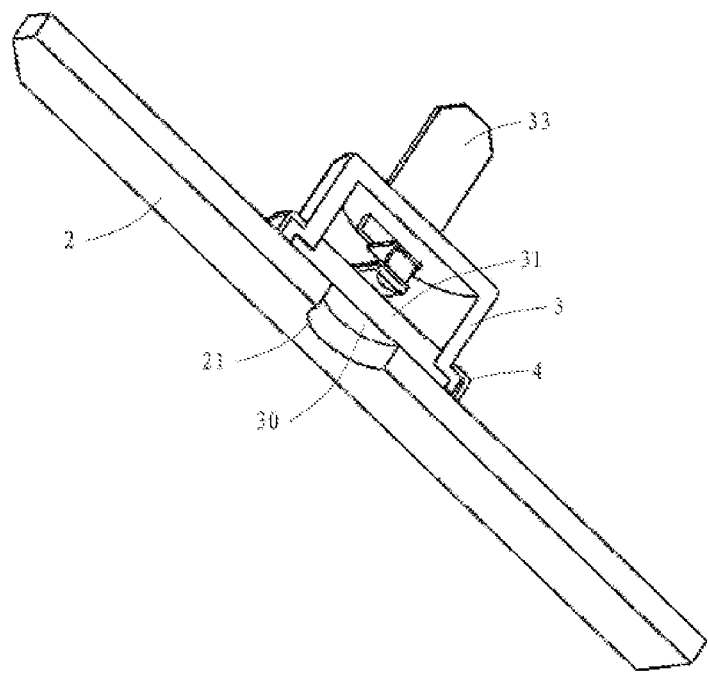
FIG. 5 is a schematic sectional view showing the thermosensitive element shown in FIG. 2 which is assembled onto the bus terminal.
Figure 6:
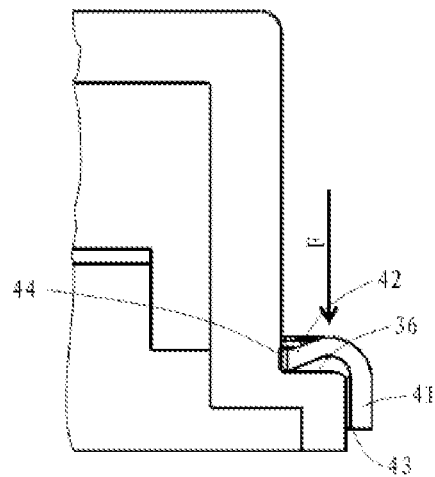
FIG. 6 is a partially enlarged schematic sectional view showing the thermosensitive element shown in FIG. 2 before being welded onto the bus terminal.
Figure 7:
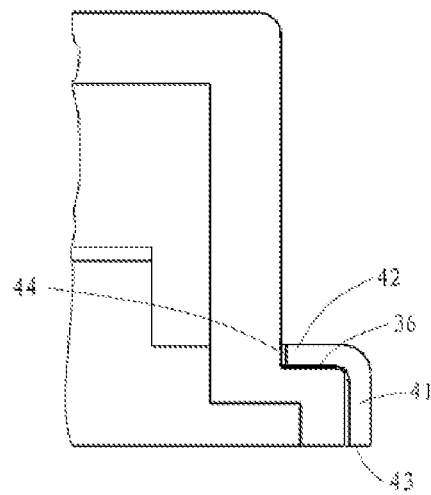
FIG. 7 is a partially enlarged schematic sectional view showing the thermosensitive element shown in FIG. 2 after being welded onto the bus terminal.
Figure 8:
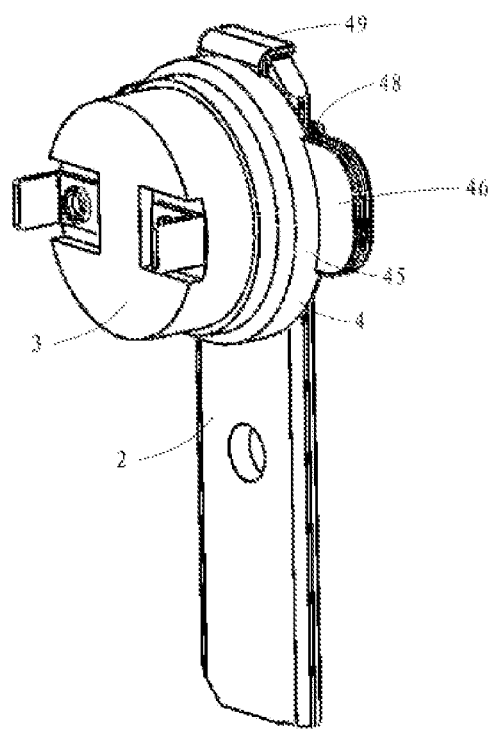
FIG. 8 is a schematic view showing the thermosensitive element according to a second exemplary embodiment of the present invention which is assembled onto the bus terminal.
Figure 9:
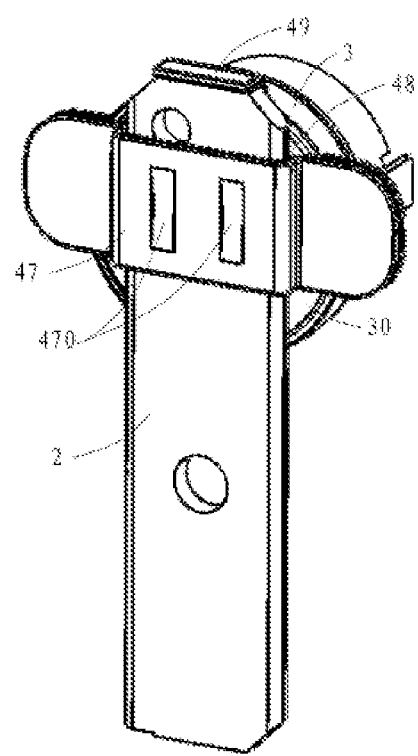
FIG. 9 is a schematic view showing the thermosensitive element according to the second exemplary embodiment of the present invention which is assembled onto the bus terminal from another perspective.

FIG. 1 shows a schematic partial view of a motor according to an exemplary embodiment of the present invention, wherein an excitation coil 1 is shown connected with a bus terminal 2, but a thermosensitive element 3 is not yet mounted therein. FIGS. 2-7 show a partial structure according to a first exemplary embodiment of the present invention, and FIGS. 8-9 show a partial structure according to a second exemplary embodiment of the present invention. It is known to those skilled in the art that a motor is a device that transforms electrical energy into kinetic energy. The motor according to the exemplary embodiments of the present invention can be of various forms, such as a DC motor, AC motor, etc. Referring to FIGS. 1-7, the motor of an exemplary embodiment of the present invention comprises an excitation coil 1 and a thermosensitive element 3. The excitation coil 1 is electrically connected with a bus terminal 2. Current flows through the bus terminal 2 during operation of the motor. The bus terminal 2 has a thermal contact surface 20, and the thermosensitive element 3 has a collection surface 30. The thermosensitive element 3 is fixed to the bus terminal 2, and the thermal contact surface 20 is in thermal contact with the collection surface 30.

Optionally, the motor further comprises a bracket 4 which is fixed to the bus terminal 2 and holds the thermosensitive element 3 at least partially between the bracket 4 and the bus terminal 2. The bracket 4, which is pre-deformed elastically, applies elastic pre-pressure to the thermosensitive element 3 in a direction towards the bus terminal 2.

Optionally, a section reducing structure 21 is provided at a location on the bus terminal 2 that is adjacent to the thermal contact surface 20 for reducing a local area of a conductive section of the bus terminal 2. The bracket 4 is welded around the section reducing structure 21 of the bus terminal 2 by the way of laser welding, and the collection surface 30 contacts the thermal contact surface 20 around the section reducing structure 21. While the section reducing structure 21 is a through hole extending through the bus terminal 2 as shown in the drawings, it will be appreciated by those skilled in the art that the section reducing structure 21 is not limited to the through hole and may also be of other forms. For example, the section reducing structure 21 can also be a recess which is recessed into the bus terminal 2, as long as the area of a partial conductive section of the bus terminal 2 is reduced. Since the total amount of current flowing through the bus terminal 2 is definite, the density of current will become more dense adjacent to the section reducing structure 21 of the bus terminal 2 due to the reduction in the area of a partial conductive section adjacent to the section reducing structure 21, and heat generation will become more apparent adjacent to the section reducing structure 21 than in other areas. That is to say, the temperature in the region around the section reducing structure 21 will be higher. Therefore, the bracket 4 is welded around the section reducing structure 21 of the bus terminal 2, and the thermosensitive element 3 is fixed around the section reducing structure 21 of the bus terminal 2. Besides, the collection surface 30 of the thermosensitive element 3 is in contact with the thermal contact surface 20 around the section reducing structure 21 such that the response of thermosensitive element 3 to the variation of temperature caused by overload of current is more sensitive, and the thermosensitive element 3 can provide a sensitive thermal protection function for the motor of the present invention.

Those skilled in the art will appreciate that the thermosensitive element 3 can be of many forms. In an exemplary embodiment, as shown in the enlarged view of FIG. 4, the thermosensitive element 3 is a thermosensitive switch comprising a thermal bimetallic piece 31. The thermal bimetallic piece 31 has a memory effect of deforming with a variation of temperature. For example, in the exemplary embodiment shown in FIG. 4, the thermal bimetallic piece 31 comprises a cantilever 34 which is substantially flat at normal temperatures. A distal end of the cantilever 34 is fixed with a bridging terminal 32. Advantageously, the distal end of the cantilever 34 and the bridging terminal 32 are fixed by means of an insulator 35, thus cutting off electrical connection between the bridging terminal 32 and the cantilever 34. In a range of normal temperatures, the bridging terminal 32 is in electrical contact with both of two electrical connection terminals 33. The thermosensitive element 3 is connected to the circuit of the motor in series by the two electrical connection terminals 33. When the temperature rises, the cantilever 34 will deform such that the distal end thereof moves downwardly. When the temperature rises to a predetermined value, the cantilever 34 drives the bridging terminal 32 connected to the distal end of the cantilever 34 to move downwardly. After the bridging terminal 32 moves downwardly, the electrical connection between the bridging terminal 32 and two electrical connection terminals 33 is cut off, thus breaking the circuit of the motor and stopping the operation of the motor automatically. When the motor which has ceased operation cools down gradually naturally and returns to a range of normal temperatures, the cantilever 34 of the thermal bimetallic piece 31 returns to a flat state and the bridging terminal 32 returns to be in electrical contact with both of the two electrical connection terminals 33 such that the circuit of the motor is switched on and the motor has been restored with the capability of normal functioning. The bottom surface of the thermal bimetallic piece 31 is exposed and the collection surface 30 is located on the bottom surface of the thermal bimetallic piece 31. It is known to those skilled in the art that the collection surface 30 can also be in thermal contact with the thermal bimetallic piece 31 via a heat conductive component.

In an exemplary embodiment, the bracket 4 comprises a side wall 41 and an end wall 42 that are formed integrally of metal. The end wall 42 is located at an end of the side wall 41, and a first opening 43 is formed at another end of the side wall 41. The thermosensitive element 3 is mounted to the bracket 4 from the first opening 43 and at least partially pressed against an inner side of the end wall 42, and an edge of the first opening 43 of the side wall 41 is welded to the bus terminal 2. Those skilled in the art will appreciate that the technology of welding the metal bracket 4 to the bus terminal 2 is known, for example, the metal bracket 4 can be welded onto the bus terminal 2 by the way of laser welding. Advantageously, since the structure of bracket 4 is simple and the area of the bus terminal 2 that is occupied by the edge of the first opening 43 is small, the technical solution can mount the thermosensitive element 3 onto the bus terminal 2 stably and fixedly at a low cost, and only a small space is required to mount the thermosensitive element 3.

A second opening 44 communicating the inner side and the outer side thereof is provided at a middle portion of the end wall 42. The thermosensitive element 3 extends to the outside of the end wall 42 partially through the second opening 44. As shown in the drawings, both of electrical connection terminals 33 are exposed to the outside of the end wall 42 so as to connect with the circuit of the motor electrically. In combination with and with particular reference to FIGS. 6 and 7, advantageously, the end wall 42 is pre-deformed elastically so that the inner side thereof applies elastic pre-pressure to the thermosensitive element 3. As shown in FIG. 6, before the bracket 4 is welded to the bus terminal 2, the end wall 42 is formed with a bend slightly inclined inwardly at its middle portion. When the bracket 4 is placed onto the thermosensitive element 3, the end wall 42 rests on a shoulder portion 36 at the periphery of the thermosensitive element 3, and the middle portion of the end wall 42 contacts the shoulder portion 36. The periphery of the end wall 42 is away from the shoulder portion 36, and the side wall 41 connected to the periphery of the end wall 42 is away from the thermal contact surface 20 of the bus terminal 2. By applying a pressure F which is directed inwardly along the axial direction of the bracket 4 to the end wall 42 (the downward pressure F shown in FIG. 6), the end wall 42 of the bracket 4 of the thermosensitive element 3 is first pressed to be flat such that the edge of the first opening 43 of the side wall 41 of the bracket 4 contacts the thermal contact surface 20 of the bus terminal 2. It is worth noting that at this time, the end wall 42 pre-deforms elastically, i.e., deforms to be flat from being inclined. Then, the edge of the first opening 43 is welded to the bus terminal 2. After the welding is completed, the thermosensitive element 3 is fixed onto the bus terminal 2 by the bracket 4 and the pressure applied to the end wall 42 can be removed, as shown in FIG. 7. Since the end wall 42 pre-deforms elastically, the end wall 42 can continue applying elastic pre-pressure which is directed to the bus terminal 2 to the shoulder portion 36 at the periphery of the thermosensitive element 3. The elastic pre-pressure can stably fix the thermosensitive element 3 onto the bus terminal 2, and the thermal contact surface 20 is in close abutment with the collection surface 30 so as to form an excellent thermal contact, thus providing excellent heat transfer effect.

FIGS. 8 and 9 are schematic views showing the thermosensitive element 3 according to a second exemplary embodiment of the present invention which is assembled onto the bus terminal 2. The common features between the first and second exemplary embodiments are not further discussed herein. The unique features of the second exemplary embodiment are mainly described hereinafter. In the second exemplary embodiment of the present invention, the bracket 4 comprises a main body portion 45 and two side arms 46 extending out laterally from two opposite sides of the main body portion 45, respectively. The bracket 4 further comprises an elastic tab 47 whose two opposite ends are connected with the two side arms 46 respectively and a longitudinally extending passage 48 formed between a middle portion of the elastic tab 47 and the collection surface 30 of the thermosensitive element 3. Those skilled in the art will appreciate that the manner of connecting the two opposite ends of the elastic tab 47 to the two side arms 46, respectively, is known and may include, for example, welding, riveting or the like. The elastic tab 47 is spaced apart from the collection surface 30, and the bus terminal 2 is inserted into the passage 48. The distance between the elastic tab 47 and the collection surface 30 is designed to be slightly smaller than the thickness of the bus terminal 2. When the bus terminal 2 is inserted between the elastic tab 47 and the collection surface 30, the bus terminal 2 presses against the elastic tab 47, which causes the elastic tab 47 elastically to deform outwardly to some extent. Thus, the elastic tab 47 provides elastic pre-pressure which is directed to the collection surface 30 and the bus terminal 2. Advantageously, such a structure enables the bus terminal 2 mounted to the bracket 4 to be detached. If the thermosensitive element 3 is damaged or required to be replaced for various reasons, the old thermosensitive element 3 can be easily detached and a new thermosensitive element 3 can be used to replace the old one, without any destructive damage to the bus terminal 2 of the motor, thus facilitating replacement or maintenance of the thermosensitive element 3. In addition, it is also understood by those skilled in the art that in the second exemplary embodiment of the present invention, the area of the bus terminal 2 that is occupied by the thermosensitive element 3 is also very small.

It should be stated that in the present application, such orientation terms as lateral, longitudinal, upper, lower and axial, etc. are used. Unless particularly otherwise indicated, these orientation terms are used only for the purpose of describing relative positional relationship, rather than absolute orientation. For example, "upper" and "lower" are relative directions, "lateral" and "longitudinal" are directions that are substantially perpendicular to each other, and "axial" is a direction along or parallel to a central axis of an object.

Optionally, the elastic tab 47 is formed by stamping a metal sheet, and a protrusion 470 which protrudes towards the passage 48 is formed by stamping the middle portion of the elastic tab 47, as shown in FIG. 9. Optionally, a stop tab 49 extends out of the main body portion 45, and the stop tab 49 prevents a longitudinal displacement of the bus terminal 2 inserted into the passage 48. Therefore, the thermosensitive element 3 can be positioned at a distal end of the bus terminal 2.

The present invention also provides a starter for a vehicle comprising a motor described above. The starter for the vehicle substantially consists of a DC motor, a transmission and a control device, etc. When the engine of the vehicle is started, the motor generates a rotational moment under the action of direct current from a storage battery. The rotational moment is transmitted to a ring gear on the engine fly wheel via the transmission so as to drive the crankshaft of the engine in rotation, thus starting the engine. The transmission can comprise a retarding mechanism connected with an output shaft of the motor, an overrun clutch connected with the retarding mechanism, an output shaft connected with the overrun clutch via a spline at a rear end, and a pinion mounted at a front end of the output shaft and used for driving the ring gear. It is also possible that the transmission does not comprise the retarding mechanism. Then, the output shaft of the motor can be connected directly with the overrun clutch. The control device is used to control operation of the motor and axial displacement of the output shaft so that the pinion engages and disengages with the ring gear.

The above described exemplary embodiments are used only for illustrating the present invention, rather than limiting the present invention. Those skilled in the art can also make various modifications and variations thereto without departing from the scope of the present invention. Therefore, all equivalent solutions will also fall within the scope of the present invention, and the scope of protection of the present invention should be defined by the claims.

What is claimed is:

1. A motor, comprising:
    an excitation coil electrically connected with a bus terminal through which current flows when the motor is in operation, the bus terminal including a thermal contact surface;
    a thermosensitive element attached to the bus terminal and including a collection surface in thermal contact with the thermal contact surface; and
    a bracket attached to the bus terminal and holding the thermosensitive element at least partially between the bracket and the bus terminal, wherein the bracket, which is pre-deformed elastically, applies elastic pre-pressure to the thermosensitive element in a direction towards the bus terminal,
    wherein the bracket includes an elastic tab which is spaced apart from the collection surface, the bus terminal is detachably mounted to the bracket and is inserted between the elastic tab and the collection surface, and the elastic tab provides elastic pre-pressure to the bus terminal,
    wherein the bracket includes a main body portion and two side arms, the two side arms extend out laterally from two opposite sides of the main body portion respectively, two opposite ends of the elastic tab are connected to the two side arms respectively and a longitudinally extending passage is formed between a middle portion of the elastic tab and the collection surface, and the bus terminal is inserted into the passage, and
    wherein the elastic tab is a stamped portion of a metal sheet, and a protrusion which protrudes towards the passage is a stamped middle portion of the elastic tab.

2. The motor according to claim 1, wherein the bracket includes a side wall and an end wall formed integrally of metal, the end wall is located at an end of the side wall, and a first opening is formed at another end of the side wall, wherein the thermosensitive element is mounted to the bracket from the first opening and at least partially pressed against an inner side of the end wall, and an edge of the first opening of the side wall is welded to the bus terminal.

3. The motor according to claim 2, wherein a second opening is provided at a middle portion of the end wall of the bracket to communicate with the inner side and an outer side of the end wall, and the thermosensitive element extends to the outer side of the end wall at least partially through the second opening.

4. The motor according to claim 2, wherein the end wall is elastically pre-deformed such that the inner side applies the elastic pre-pressure to the thermosensitive element.

5. The motor according to claim 1, wherein a section reducing structure is provided at a location on the bus terminal that is adjacent to the thermal contact surface for reducing a local area of a conductive section of the bus terminal, the bracket is welded around the section reducing structure of the bus terminal by laser welding, and the collection surface contacts the thermal contact surface around the section reducing structure.

6. The motor according to claim 5, wherein the section reducing structure is a through hole which extends through the bus terminal or a recess which is recessed into the bus terminal.

7. The motor according to claim 1, wherein a stop tab extends out of the main body portion, the stop tab preventing a longitudinal displacement of the bus terminal inserted into the passage.

8. The motor according to claim 1, wherein the thermosensitive element includes a thermal bimetallic piece, the collection surface being located on the thermal bimetallic piece or in thermal contact with the thermal bimetallic piece.

9. A starter for a vehicle, comprising:
    a motor, including:
        an excitation coil electrically connected with a bus terminal through which current flows when the motor is in operation, the bus terminal including a thermal contact surface; and
        a thermosensitive element fixed onto the bus terminal and including a collection surface in thermal contact with the thermal contact surface; and
        a bracket attached to the bus terminal and holding the thermosensitive element at least partially between the bracket and the bus terminal, wherein the bracket, which is pre-deformed elastically, applies elastic pre-pressure to the thermosensitive element in a direction towards the bus terminal;

wherein the bracket includes an elastic tab which is spaced apart from the collection surface, the bus terminal is detachably mounted to the bracket and is inserted between the elastic tab and the collection surface and the elastic tab provides elastic pre-pressure to the bus terminal, wherein the bracket includes a main body portion and two side arms, the two side arms extend out laterally from two opposite sides of the main body portion respectively, two opposite ends of the elastic tab are connected to the two side arms respectively and a longitudinally extending passage is formed between a middle portion of the elastic tab and the collection surface, and the bus terminal is inserted into the passage, and wherein the elastic tab is a stamped portion of a metal sheet, and a protrusion which protrudes towards the passage is a stamped middle portion of the elastic tab.

10. The starter according to claim 9, wherein the bracket includes a side wall and an end wall formed integrally of metal, the end wall is located at an end of the side wall, and a first opening is formed at another end of the side wall, wherein the thermosensitive element is mounted to the bracket from the first opening and at least partially pressed against an inner side of the end wall, and an edge of the first opening of the side wall is welded to the bus terminal.

11. The starter according to claim 10, wherein a second opening is provided at a middle portion of the end wall of the bracket to communicate with the inner side and an outer side of the end wall, and the thermosensitive element extends to the outer side of the end wall at least partially through the second opening.

12. The starter according to claim 10, wherein the end wall is elastically pre-deformed such that the inner side applies the elastic pre-pressure to the thermosensitive element.

13. The starter according to claim 9, wherein a section reducing structure is provided at a location on the bus terminal that is adjacent to the thermal contact surface for reducing a local area of a conductive section of the bus terminal, the bracket is welded around the section reducing structure of the bus terminal by laser welding, and the collection surface contacts the thermal contact surface around the section reducing structure.

14. The starter according to claim 13, wherein the section reducing structure is a through hole which extends through the bus terminal or a recess which is recessed into the bus terminal.

15. The starter according to claim 9, wherein a stop tab extends out of the main body portion, the stop tab preventing a longitudinal displacement of the bus terminal inserted into the passage.

16. The starter according to claim 9, wherein the thermosensitive element includes a thermal bimetallic piece, the collection surface being located on the thermal bimetallic piece or in thermal contact with the thermal bimetallic piece.

* * * * *